(12) United States Patent
Liddell et al.

(10) Patent No.: US 8,707,320 B2
(45) Date of Patent: Apr. 22, 2014

(54) DYNAMIC PARTITIONING OF DATA BY OCCASIONALLY DOUBLING DATA CHUNK SIZE FOR DATA-PARALLEL APPLICATIONS

(75) Inventors: Michael Liddell, Seattle, WA (US); Igor Ostrovsky, Bellevue, WA (US); Stephen Toub, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 12/712,986

(22) Filed: Feb. 25, 2010

(65) Prior Publication Data

US 2011/0208872 A1   Aug. 25, 2011

(51) Int. Cl.
*G06F 9/46* (2006.01)

(52) U.S. Cl.
USPC .......................................................... 718/104

(58) Field of Classification Search
None
See application file for complete search history.

(56) References Cited

U.S. PATENT DOCUMENTS

| | | | | |
|---|---|---|---|---|
| 5,021,946 | A * | 6/1991 | Korty | 1/1 |
| 5,692,193 | A * | 11/1997 | Jagannathan et al. | 718/106 |
| 5,987,468 | A * | 11/1999 | Singh et al. | 1/1 |
| 6,496,901 | B1 * | 12/2002 | De Martine et al. | 711/113 |
| 6,700,902 | B1 * | 3/2004 | Meyer | 370/468 |
| 7,551,617 | B2 | 6/2009 | Eatherton et al. | |
| 7,613,848 | B2 | 11/2009 | Amini et al. | |
| 2003/0231627 | A1 | 12/2003 | John et al. | |
| 2005/0141503 | A1 | 6/2005 | Welfeld | |
| 2008/0133561 | A1 * | 6/2008 | Dubnicki et al. | 707/101 |
| 2008/0244084 | A1 * | 10/2008 | Dierks et al. | 709/236 |
| 2009/0031175 | A1 * | 1/2009 | Aggarwal et al. | 714/47 |
| 2011/0161976 | A1 * | 6/2011 | Alexander et al. | 718/104 |

OTHER PUBLICATIONS

Increasing Chunk Size Loop Scheduling Algorithms for Data Independent Loops, Teebu Philip, R. Das, L. Brady, John J. Metzner, Joseph M. Lambert, Pennsylvania State University, 1995.*
Collins, et al., "Flexible Filters: Load Balancing through Backpressure for Stream Programs", Retrieved at << http://portal.acm.org/ft_gateway.cfm?id=1629363&type=pdf&coll=GUIDE&dl=GUIDE&CFID=63199920&CFTOKEN=13317766 >>, Proceedings of the seventh ACM international conference on Embedded software, Oct. 12-16, 2009, pp. 205-214.
Xing, et al., "Dynamic Load Distribution in the Borealis Stream Processor", Retrieved at << http://www.cs.brown.edu/research/aurora/xing.icde05.load.pdf >>, Proceedings of the 21st International Conference on Data Engineering, Apr. 5-8, 2005, pp. 12.

(Continued)

*Primary Examiner* — Meng An
*Assistant Examiner* — James J Lee
(74) *Attorney, Agent, or Firm* — Kevin Sullivan; Peter Taylor; Micky Minhas

(57) ABSTRACT

Dynamic data partitioning is disclosed for use with a multiple node processing system that consumes items from a data stream of any length and independent of whether the length is undeclared. Dynamic data partitioning takes items from the data stream when a thread is idle and assigns the taken items to an idle thread, and it varies the size of data chunks taken from the stream and assigned to a thread to efficiently distribute work loads among the nodes. In one example, data chunk sizes taken from the beginning of the data stream are relatively smaller than data chunk sizes taken towards the middle or end of the data stream. Dynamic data partitioning employs a growth function where chunks have a size related to single aligned cache lines and efficiently increases the size of the data chunks to occasionally double the amount of data assigned to concurrent threads.

19 Claims, 5 Drawing Sheets

(56) References Cited

OTHER PUBLICATIONS

Xing, Ying, "Load Distribution for Distributed Stream Processing", Retrieved at << http://www.springerlink.com/content/tmpjq4vtw2xwg7ep/fulltext.pdf >>, Lecture notes in computer science, Current trends in database technology—EDBT 2004 workshop, Mar. 14-18, 2004, pp. 112-120.

Balazinska, et al., "Load Management and High Availability in the Medusa Distributed Stream Processing System", Retrieved at << http://www.cs.brown.edu/research/borealis/public/publications/sigmod04.demo.pdf >>, Proceedings of the 2004 ACM SIGMOD international conference on Management of data, Jun. 13-18, 2004Jun. 2004, pp. 2.

* cited by examiner

DYNAMIC PARTITIONING OF DATA BY OCCASIONALLY DOUBLING DATA CHUNK SIZE FOR DATA-PARALLEL APPLICATIONS

BACKGROUND

Computer applications having concurrent threads executed on multiple processors present great promise for increased performance but also present great challenges to developers. The growth of raw sequential processing power has flattened as processor manufacturers have reached roadblocks in providing significant increases to processor clock frequency. Processors continue to evolve, but the current focus for improving processor power is to provide multiple processor cores on a single die to increase processor throughput. Sequential applications, which have previously benefited from increased clock speed, obtain significantly less scaling as the number of processor cores increase. In order to take advantage of multiple core systems, concurrent (or parallel) applications are written to include concurrent threads distributed over the cores. Parallelizing applications, however, is challenging in that many common tools, techniques, programming languages, frameworks, and even the developers themselves, are adapted to create sequential programs.

Data parallelism is a form of concurrency that involves distributing application data across many different nodes for processing. An aspect of data parallelism includes taking an input data stream having a single-ended sequence of items, or a sequence of items in a data stream of an unknown length, and efficiently passing the items to multiple threads for concurrent processing. A first approach to this aspect is to take one item at a time and pass it to a thread. A second approach is to take items in fixed chunk sizes, e.g., eight items at a time. A third approach is to vary the size of the chunks passed to threads. The first two approaches are often adequate in certain situations, but lead to poor performance in others. The third approach is open-ended and loosely specified, and it is often avoided because of a tendency to be unstable and inefficient.

SUMMARY

This summary is provided to introduce a selection of concepts in a simplified form that are further described below in the Detailed Description. This summary is not intended to identify particular features or essential features of the claimed subject matter, nor is it intended to be used to limit the scope of the claimed subject matter.

A dynamic data partitioning system and operation are disclosed for use with a multiple node processing system, such as a multiple core processor, that consumes items from a data stream of any length and independent of whether the length is undeclared. The system and operation takes items from the data stream when a task is idle, assigns the taken items to an idle task, which prossesses the items, and requests more data to process. In one example, the dynamic data partitioning operation increases the size of data chunks taken from the stream and assigned to a task to distribute work loads among the nodes of the system.

Data chunk sizes taken from the beginning of the data stream chosen to be relatively smaller than data chunk sizes taken towards the middle or end of the data stream. This strategy is suitable for streams of unknown lengths. If the stream turns out to include a relatively small number of items, i.e., such as streams of less than one-thousand items, the use of initially small data chunk sizes will permit load balancing. If the stream turns out to include a relatively large number of items, i.e., streams of a thousand items or more, the eventual use of large chunk sizes will reduce the amount of synchronization overheads. In one example, the dynamic data partitioning employs a growth function where chunk sizes are proportional to single aligned cache lines of the processing system. The growth function efficiently increases the size of the data chunks to occasionally double the amount of data assigned to concurrent threads. The dynamic data partitioning operation can be implemented as a method, software product, or another logic mechanism.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
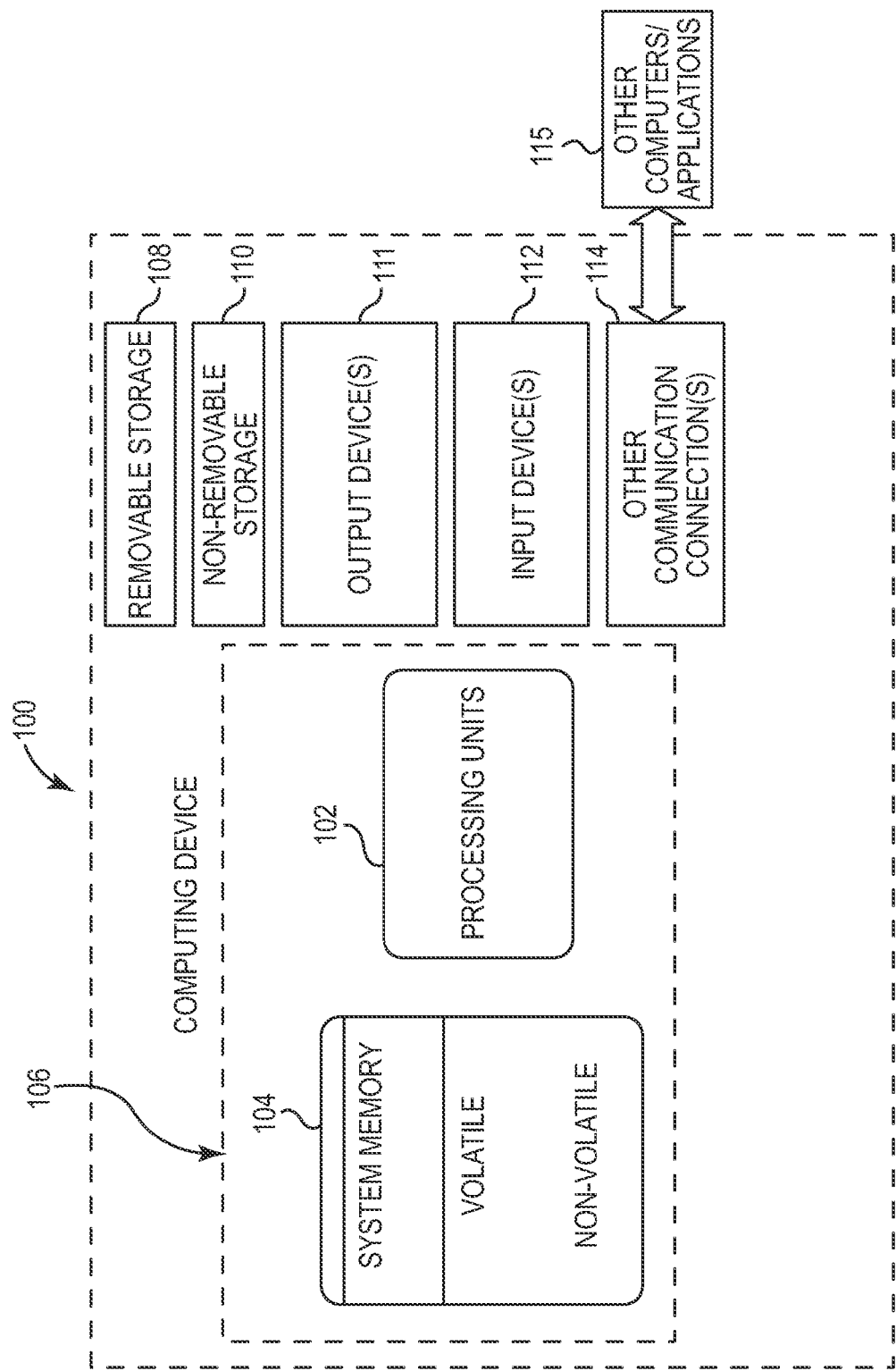
FIG. 1 is a block diagram illustrating an example computing device.

FIG. 1 illustrates an exemplary computer system that can be employed as an operating environment includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

Computing device 100 can be configured to run an operating system software program and one or more software applications, which make up a system platform. In one example, computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment. One example of a managed environment is available under the trade designation .NET Framework available from Microsoft Corporation of Redmond, Wash., USA.

A computer application configured to execute on the computing device 100 includes at least one process, which is an executing program. Each process provides the resources to execute the program. One or more threads run in the context of the process. A thread is the basic unit to which an operating system allocates time in processor 102. The thread is the entity within a process that can be scheduled for execution. Threads of a process can share its virtual address space and system resources. Each thread can include exception handlers, a scheduling priority, thread local storage, a thread identifier, and a thread context (or thread state) until the thread is scheduled. In parallel applications, threads can be concurrently executed on processor 102.

Figure 2:
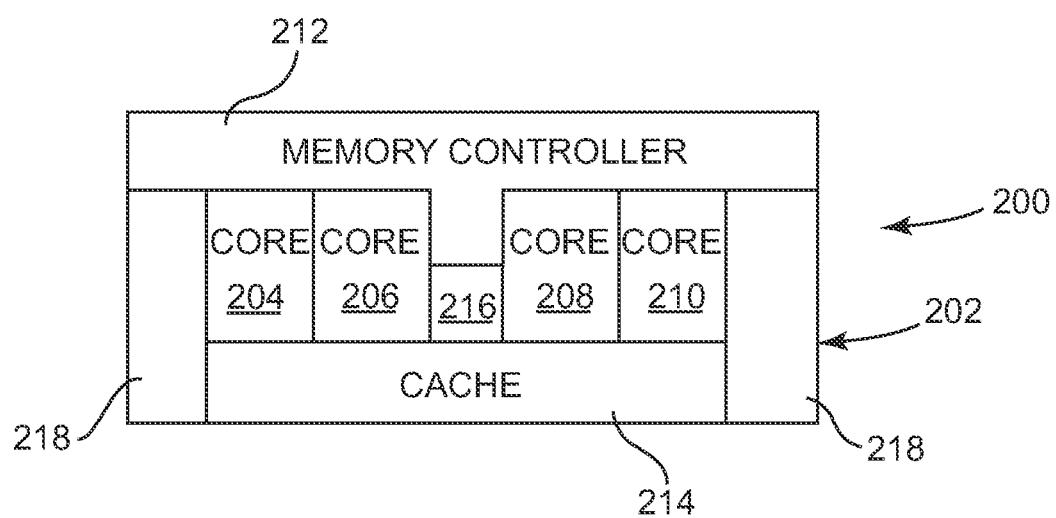
FIG. 2 is a schematic diagram illustrating an example of a multiple core processing system of the computing device of FIG. 1.

FIG. 2 an example multiple core processor 200 that can be implemented in computing device 100 as processor 102 to concurrently execute threads. This example includes multiple cores implemented on a single die 202. The example multiple core processor 200 includes four physical processor cores 204, 206, 208, 210, or simply four physical cores, where each of the physical cores is available to process at least one application thread concurrently with at least one other physical core processing another thread. The physical cores 204, 206, 208, 210, are adjacent to a memory controller 212 and a cache 214 on the die 202 as shown. Each of the cores is associated with a cache hierarchy. In one example, the architecture of processor 102 includes cache in the physical core 204, 206, 208, 210 (such as L1 and L2 cache), an L3 cache in cache 214, memory 104 served by memory controller 212, and so on. Caches L1, L2, and L3 in this example can represent on-die memory because they are located on the die 202, whereas the memory hierarchy can further extend to off-die memory such as memory 104. Each location in memory includes a cache line, which can vary in length depending on the processor and memory used. For example, a typical cache line can include a length of 16, 32, or 128 words and so on. In the example die 202, a queue 216 is disposed the die between memory controller 212 and cache 214. The die 202 can include other features 218 or combination of features such as a memory interfaces, miscellaneous input/output blocks, proprietary interconnects, expansion card interfaces, and the like.

Each physical core may be capable of efficiently and concurrently executing multiple threads of a concurrent process. Such physical cores are often referred to as "Simultaneous Multi-Threading," or simply "SMT," cores, and the concurrently executed threads on each physical core share hardware resources included within the single physical core. In the example of the multiple core processing system 200, each physical core is capable of multithreading. Each physical core capable of multithreading can present the operating system with as many logical cores as concurrently executing threads it supports. In the example multiple core processor 200, each physical core 204, 206, 208, 210 is capable of concurrently executing two threads, and thus provides the operating system with eight concurrent logical cores.

In some examples, a single processor (not shown) or the multiple core processor 102 can be included as part of multiple processor architectures depending performance considerations. Non-uniform memory access (NUMA) and symmetric multiprocessing (SMP) systems provide two common examples of available multiple processor architectures. Each processor or logical core within the multiprocessor architecture is capable of executing a thread. Multiple processor architectures can further be combined with other multiple processor architectures in distributed systems. The myriad of available or later developed combinations of logical cores, physical cores, processors, and multiple processor systems can be used to implement the data partitioning mechanism, but the data partitioning mechanism is not limited to any particular processing system or architecture. In order to account for the multiple architectures available for use with this disclosure, each unit capable of concurrently executing a thread or component is generally described here as a "core" or "node." Accordingly, systems or processors including 16, 32, or more cores or nodes, are contemplated.

Figure 3:
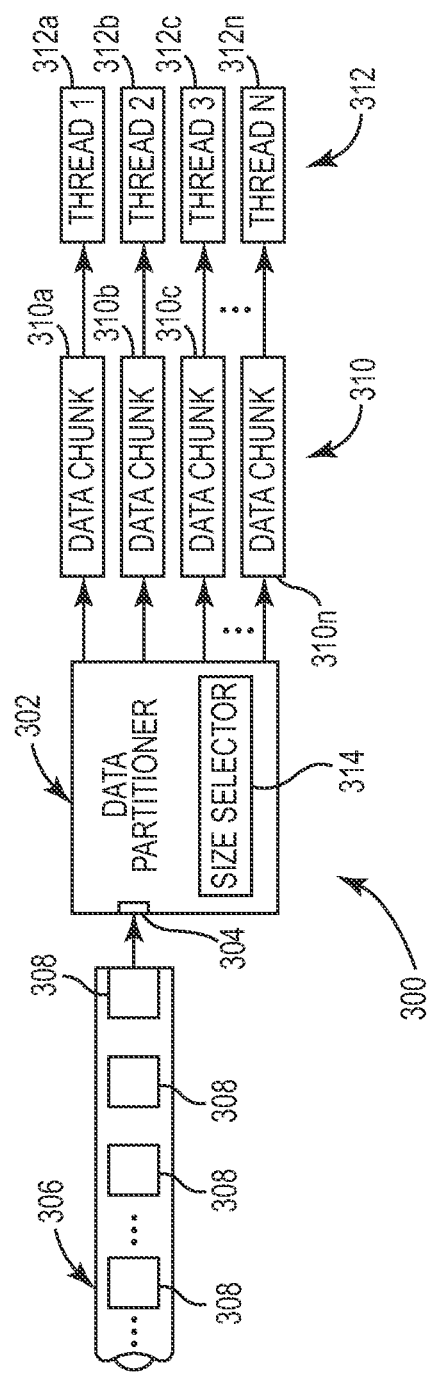
FIG. 3 is a block diagram illustrating one embodiment of an example implementation of a data partitioning system in a multiple core processing system such as the example of FIG. 2.

FIG. 3 illustrates one embodiment of an example dynamic data partition system 300. Dynamic data partitioning system 300 includes a data partitioner 302. Data partitioner 302 includes an input 304 for receiving at least one stream of data, or data stream 306. Data stream 306 includes a plurality of items 308. Data partitioner 302 consumes data stream 306 and partitions items 308 into data chunks 310, such as 310a, 310b, 310c-310n, that are then assigned to available concurrent threads 312, such as 312a, 312b, 312c-312n, on available processing nodes for processing. As threads 312 become idle, in one example, another data chunk 310 is assigned until the entire data stream 306 is consumed and all of the items 308 in the data stream are assigned. Data partitioner 302 selects a size of each data chunk 310 based on a size-selector function 314 operating with data partitioner 302.

Relative terms such as short, medium or long are used to describe the length of data stream 306, or the amount of items 308 in data stream 306. In one sense, the relative length of data streams 306 references the number of items 308 to the number of threads. The examples described below were discovered on systems of up to 16 available threads or so, and thus short streams and long streams are described in terms of number of items rather than a ratio of items to threads, which provides a suitable approximation for many systems.

Data stream 306 in this example is not limited by data type or by the number of items 308 in data stream 306. Examples are contemplated where data stream 306 include one or a few items 308 to millions of items 308 or more. Further, data stream 306 can be of an undeclared length or size, or can be of a declared or a known length or size. Load balancing can be applied in situations of data streams 306 of known length including examples where items the items 308 can take different times to process. Data stream 306 can include a set of items 308 in the computer storage media of computing device 100 or data stream 306 can arrive directly from a data-generating source from outside of the computing device 100. In one particular implementation, data stream 306 can be an enumerable, or the like, for use with a Parallel Language Integrated Query (or PLINQ), which is a component of a concurrency support programming model available as part of the .NET Framework 4 from Microsoft Corporation and other concurrency offerings. Other kinds of concurrency programming support models are contemplated.

Data chunks 310 of any size are contemplated. Hence, the size-selector function 314 can select the size of each data chunk 310 to be any number from one to n items. Each data chunk 310 taken from data stream 306 incurs overheads such as locking the enumerable, taking items 308 from data stream 306, unlocking the enumerable, and so on. If the chunk size is fixed as too small, the overheads become noticeable as performance degradations in longer data streams 306. Hence, if the enumerable has many items, such as many thousands or more, data chunks 310 having sizes of one hundred twenty-eight items 308 or more can provide for reduced amortized overheads.

If the chunk size is fixed as too large, however, data partitioner 302 may come to the end of data stream 306 while some threads still remain idle. For illustration, if data stream 306 includes x items 308 (such as sixteen items), and data partitioning system 300 includes a plurality of available concurrent threads 312, a chunk size of x amount of items (such as sixteen) would be processed as a load in one thread, i.e., thread 312a, while the remaining threads are idle. Thus, relatively large data chunk sizes interfere with the ability of data partitioner 302 to efficiently distribute loads across idle nodes.

Another consideration in selecting data chunk size includes avoiding adverse cache-effects. Common computer designs, for example, typically have low level caches 204, 206, 208, 210 in memory 104 that perform loads and stores on complete cache lines of 64 bytes or 128 bytes, and other designs also include cache lines of $2^x$ bytes. Adverse cache-effects can occur if tasks, or threads, mutate data on the same cache lines as other tasks or threads, which can risk additional overhead for computations. Thus, a recommended strategy to avoid cache-affects includes cache-line awareness to select data chunk size. For example, as data chunk size becomes larger than a few items, data chunk sizes in powers-of-2 number of items ($2^x$ number of items) have been determined to provide good cache interaction. Also, the maximum data chunk size can be set as the cache-line width so the data chunks are aligned to cache-line boundaries.

One strategy for approaching a versatile data partitioner 302, for use with data streams of unknown or undeclared size, is to incorporate a chunk-size growing pattern into the size-selector function 314. One type of growing pattern described below provides the same size data chunk to each concurrent thread before it increases. A linear growth pattern, such as providing chunk sizes of 1, 2, 3, and 4 items (and so on) up to a maximum to each concurrent thread before the pattern increases linearly is suboptimal in that the rate of growth is too slow and that it can include chunk sizes that risk loading the same cache line into more than one thread. A geometric growth pattern, such as providing chunk sizes of 1, 2, 4, 8, 16 items (and so on) up to a maximum, e.g., 128 items, to each concurrent thread before the pattern increases geometrically can reduce or avoid this risk. Once the maximum chunk size is reached, the maximum chunk size is repeated until all of the items 308 in the data stream 306 are consumed. The geometric growth pattern can be written as $$\text{original\_}f(x)=2^x; (\text{for } x=0.7)$$

The geometric growth pattern is suitable for both shorter data stream and longer data streams because the chunk sizes begin small to allow for a more balanced distribution of data and ramp up quickly to a maximum to reduce overheads. The geometric growth pattern, however, has been determined to create performance problems for data streams 306 of a medium length, for example data streams having about 16 items to about 16,384 items ($2^{14}$, or so) on processing systems having up to 16 nodes or so. (Of course, a "medium length" can include more items on processing systems having more than 16 nodes.)

For a simple illustration, consider data partitioning system 300 including a data stream of 120 items 306 for 16 concurrent threads 312. With a geometric growth pattern, each of the 16 threads will first receive data chunks of 1 item for processing in a first stage, then receive data chunks of 2 items for processing in a second stage, and then receive data chunks of 4 items for processing in a third stage. The total number items processed during the first three stages is $$16+32+64=112 \text{ items}$$

Assuming that processing each item includes a runtime of approximately 1 unit of time, the total units of runtime is $$1+2+4=7 \text{ units of time (approximately)}$$

In order to complete processing the data stream, the next available thread is assigned 8 items in a fourth stage (for processing in approximately 8 units of time) while the remaining 15 threads are idle. Accordingly, under the geometric growth pattern, 120 items are processed in 15 units of time. If, instead of a using a geometric growth pattern, data partitioner 302 assigned 8 items to each of the 16 threads, because for $$120 \text{ items}/16 \text{ available threads}=8 \text{ items per thread}$$

the amount of runtime used to process the data stream 306 would only be approximately 8 units of time. Thus, applying a geometric growth pattern to medium sized data streams can result in performance degradations of approximately fifty percent of optimal simply due to an unfortunate selection of chunk size. The root of the problem is that the geometric growth pattern increases too quickly for medium sized data stream.

Thus, a growth function that increases to 128 more slowly than the geometric growth pattern is chosen for data streams 306 of medium length. One such function that grows more slowly than the geometric sequence can be expressed as general_exponential$(x,k)=k^x$ The variable k is chosen in the range 1<k<2 in order to grow at a rate less than the geometric sequence, and 1<k≤1.3 is chosen for some instances. In an example where k is set at 1.3, the sequence produced is general_exponential$(x,1.3)$={1,1.3,1.69,2.197,2.8561, 3.7129,4.8268, . . . }.

Given that data chunk sizes other than inter-sized chunks are impractical, the general exponential can be modified to be integer_general_exponential$(x,k)$=floor$(k^x)$ which, for k=1.3, will yield a sequence of integer_general_exponential$(x,1.3)$={1,1,1,2,2,3,4,6,8, 10,13,17 . . . }.

This function grows more slowly than the geometric pattern, but still suffers from generating chunk sizes that do not match typical sizes of cache lines. To modify this function, the data chunks sizes are taken in sizes corresponding with a sequence of the largest power of 2 less than the value of the integer_general_exponential(x,k) is expressed as pow2_integer_general_exponential$(x,k)$= minPow2(floor$(k^x)$)  [Eq. 1]

which, when k=1.3, will yield a sequence of pow2_integer_general_exponential$(x,1.3)$={1,1,1,2,2, 2,4,4,8,8,8,16,16,16, . . . }

The function described as [Eq. 1] provides a suitable growth function for use with the size-selector function 314 in the data partitioner 302.

The function can be generally described as a sequence of non-decreasing powers of two. More particularly, the function for this sequence can be described as a sequence of at least one repeated power of 2 with occasional doubling. If the maximum chunk size is defined, such as 128 items, the function can be generally described as a sequence of at least one repeated power of two with occasional doubling to a maximum data chunk size. In one example, the sequence {1, 2, 2, 4, 8, 16 . . . } is within the scope of this function because "2" is the at least one repeated power of two where occasional doubling occurs each after the other powers of two. In another example, the sequence {1, 1, 1, 1, 1, 2} also is within the scope of this function because "1" is the at least one repeated power of two and the occasional doubling occurs once. Many other examples are contemplated.

Figure 4:
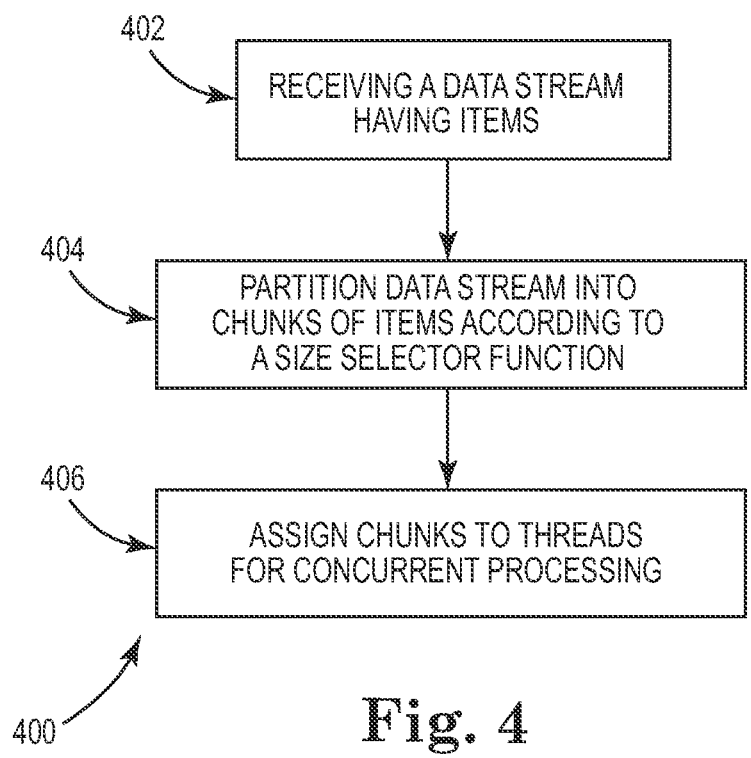
FIG. 4 is a flow diagram illustrating one embodiment of an example method for use with, for example, the data partitioning system of FIG. 3.

FIG. 4 illustrates one embodiment of an example method 400 for use with a data partitioning system such as the data partitioning system 300. A data stream 306 having a plurality of items 308, wherein the number of items is at least one of undeclared or unknown is received into a data partitioner 302 at 402. The data stream is partitioned into data chunks according to a size-selector function, or growth function, at 404. The data chunks are assigned to a plurality of concurrent threads for concurrent processing on a plurality of nodes at 406. As concurrent threads become available, such as when the assigned items are processed after the current stage, the data chunk size is continuously increased according to the size-selector function having a sequence of at least one repeated power of two with occasional doubling to a maximum data chunk size at 404. In one example, the same data chunk size is assigned to each thread for each processing stage up to at least a penultimate stage in the processing.

In certain applications, implementing [Eq. 1] is expensive in terms of processing power for multiplying floating point numbers, taking the integer portion of each floating point number, and calculating the nearest lower power of two for each integer portion in order to obtain the chunk sizes of the sequence. An approximation of [Eq. 1] still within the general description is to continuously apply a chunk size for each available concurrent thread "r" times then double the chunk size, and so on, up to a maximum chunk size. This approximation can be generally expressed as repeating_exp2$(r)$={1#r;2#r;4#r;8#r} where n#r means that n is included "r" times in the sequence, for example:

repeating_exp2(1)={1,2,4,8,16,32 . . . }; and repeating_exp2(3)={1,1,1,2,2,2,4,4,4,8,8,8 . . . }

The repeat factor "r" can be fixed or varied. If the repeat factor "r" is fixed, an "r" of 1 or more will produce a sequence of non-decreasing powers of 2. The approximation will produce a sequence of at least one repeated power of 2 with occasional doubling when the repeat factor "r" is set to 2 or more. In one example, the repeat factor "r" can be chosen to vary over a range of 1 to x during the generation of the sequence will produce a sequence of non-decreasing powers of 2 and likely a sequence of at least one repeated power of 2 with occasional doubling. A repeat factor "r" can be chosen to vary over a range of 0 to x during the generation of the sequence will likely produce a sequence of non-decreasing powers of 2. For example, the repeat factor can be increased or decreased with each doubling, or the repeat factor can be randomly chosen during generation of the sequence, and so on.

Figure 5:
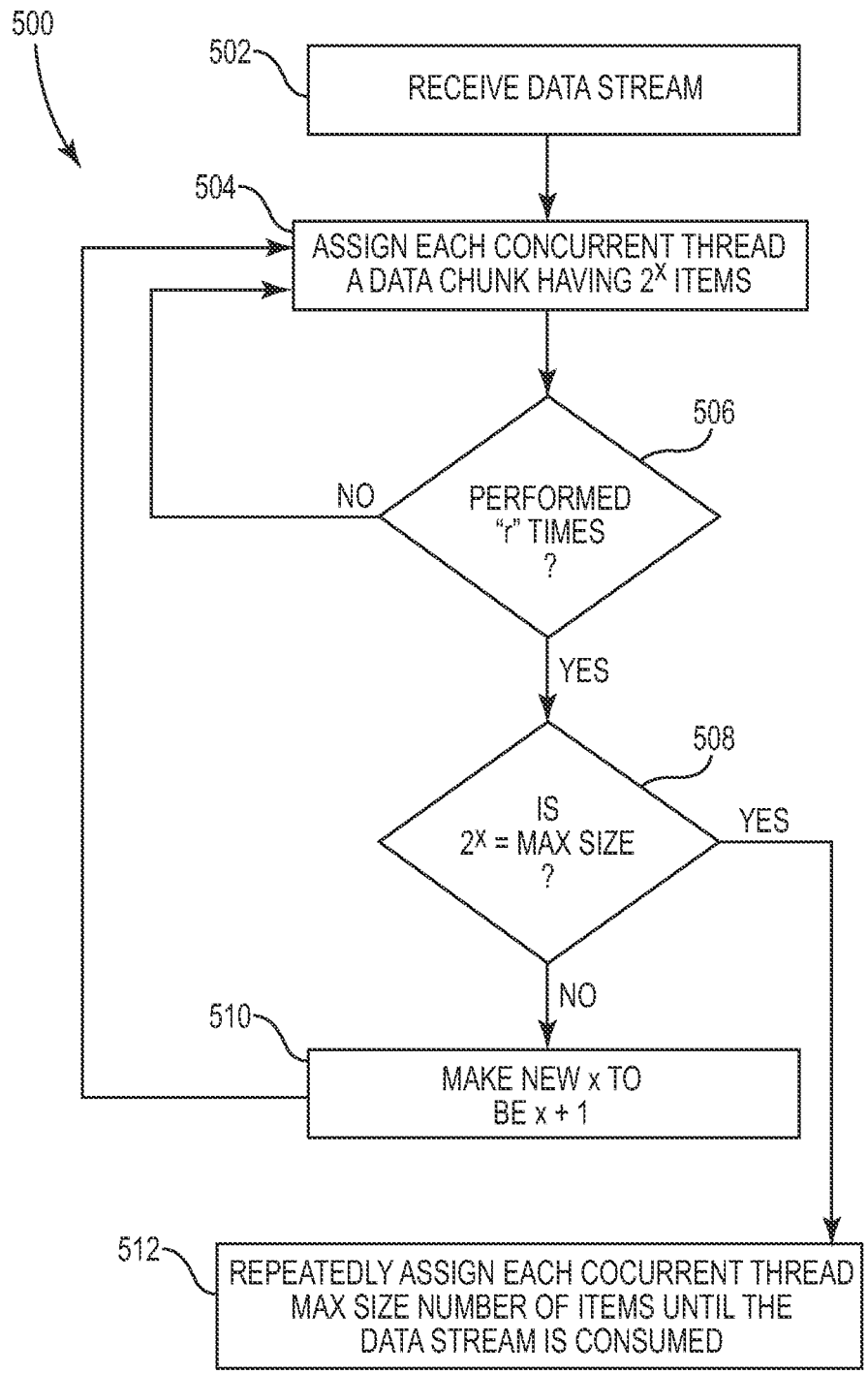
FIG. 5 is a flow diagram illustrating one embodiment of example method for use with a data partitioning system.

FIG. 5 illustrates one embodiment of an example method 500 for use with a data partitioning system assigning chunk sizes according to repeating_exp2$(r)$. A data stream 306 having a plurality of items 308, wherein the number of items is at least one of undeclared or unknown is received into a data partitioner 302 at 502. Data is partitioned into chunks sizes having $2^x$ items for each concurrent thread at 504. In one example, x can initially be set to 0. Feature 504 is performed "r" number of times at 506 (or until stream runs out of data, not shown). If $2^x$ is not the maximum chunk size at 508, $2^x$ is doubled (i.e., new $2^x$ is assigned $2^{x+1}$) at 510 and feature 504 is repeated. Once the maximum chunk size is reached at 508, each available concurrent thread is assigned the maximum chunk size of items until the stream is entirely consumed at 510.

Implementing repeating_exp2(r) can be easier than implementing [Eq. 1]. The implementation includes simple integer arithmetic rather than applying floating point numbers as described above. One implementation can be expressed as add an integer, "boolean-AND" operation, and integer multiply the chunk size. The "boolean-AND" operation is suitable for r=$2^x$–1 for some x. Otherwise, "modulo" operator is used for arbitrary values of r instead of the "boolean-AND" operation. One particular implementation is:

```
if (chunkSize < Maxsize) {
    i++;
    if (i & r == 0) // works if r = 1, 3, 7, 15, 31, and so on
        chunkSize *= 2; // compiles to a simple left shift
}
```

After experimentation with different "r" sizes, occasional doubling with a fixed repeat factor of r=7 and a maximum chunk size of 128 items provides a suitable combination of choices for balancing worst-case behavior against maximum throughput for inputs to the data partitioner 302 of nearly all lengths of data stream 306. The repeat factor of r=7 provides a moderate rate of doubling, provably low upper-bounds of inefficiency (such as from threads idle at the end of processing the stream), and the ability to implement the sequence of calculations with a "boolean-AND" operation, such as in a C# (C sharp) or similar programming language, instead a more process-intensive "modulo operation." An implementation of repeating_exp2(7) can be included in a versatile and efficient data partitioner used in PLINQ or similar concurrency support mechanisms in the .NET Framework or other frameworks.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of partitioning items in a data stream, the method comprising:
    receiving a data stream having a plurality of items of application data, wherein an amount of items in the data stream is at least one of unknown and undeclared;
    partitioning the received data stream into a plurality of data chunks including at least one item, wherein each data chunk has a data chunk size n number of items in the data chunk;
    assigning the plurality of data chunks having the same data chunk size n to a plurality of concurrent threads for processing on a multiple node processing system; and
    increasing the data chunk size n according to a sequence having at least one repeated power of two with occasional doubling up to a selected maximum data chunk size, wherein the sequence includes a selected number of the same powers of two before doubling;
    wherein the selected number is determined from a function $f(x)=2^x-1$ wherein x is an integer of at least 1; and
    wherein the partitioning, assigning, and increasing are repeated until the plurality of items are consumed.

2. The method of claim 1 wherein the same data chunk size n is assigned to each thread for each processing stage up to at least a penultimate stage in the processing.

3. The method of claim 1 wherein the selected number of the same powers of two before doubling is seven.

4. The method of claim 1 wherein the selected number is fixed for the sequence.

5. The method of claim 1 wherein the selected number is determined from a function $f(x)=2^x-1$ wherein x is an integer of at least 3.

6. The method claim 1 wherein the data chunk size is determined from repeatedly multiplying floating point numbers selected from a range of greater than 1 and less than 2, taking an integer portion of each of the floating point numbers, and calculating a nearest lower power of two for each of the integer portions.

7. The method of claim 1 wherein an initial data chunk size is one item.

8. A computer readable storage medium, which is not a transitory propagating signal, storing computer executable instructions for controlling a computing device to perform a method comprising:
    receiving a data stream having an unknown amount of a plurality of items of application data;
    partitioning the received data stream into a plurality of data chunks each including at least one item, wherein each data chunk has a data chunk size n number of items in the data chunk;
    assigning the plurality of data chunks having the same data chunk size n to a plurality of concurrent threads for processing on a multiple node processing system in the computing device; and
    increasing the data chunk size n according to a sequence of at least one repeated power of two with occasional doubling up to a selected maximum data chunk size, wherein the sequence is determined from an operation of $$\text{pow2\_integer\_general\_exponential}(x,k) = \text{minPow2}(\text{floor}(k^x)),$$

wherein x is an integer of at least 1;
    wherein 1<k<2;
    wherein the partitioning, assigning, and increasing are repeated until the plurality of items are consumed.

9. The computer readable storage medium of claim 8 wherein the instructions are included as part of concurrency support programming model.

10. The computer readable medium of claim 9 wherein the concurrency support programming model is included as part of a framework.

11. The computer readable storage medium of claim 10 wherein the framework is included as part of an operating system for use with the computing device.

12. The computer readable storage medium of claim 8 wherein 1<k≤1.3.

13. The computer readable storage medium of claim 8 wherein the sequence is determined from an operation of $$\text{repeating\_exp2}(r)=\{1\#r,2\#r,4\#r,8\#r\}$$

wherein data chunk size n is a power of two less than or equal to the maximum data chunk size, r is greater than one, n#r means that n is included r times in the sequence.

14. The computer readable storage medium of claim 13 wherein r is fixed.

15. The computer readable storage medium of claim 14 wherein r is seven.

16. A computer readable storage medium, which is not a transitory propagating signal, storing a data partitioning operation including computer executable instructions for controlling a computing device having a multiple core processing system including a plurality of cores, wherein the data partitioning operation distributes application data to the plurality of cores for concurrent processing, the data partitioning operation configured to perform a method comprising:
    receiving a data stream having at least one of an unknown or undeclared amount of a plurality of items of application data;
    partitioning the received data stream into a plurality of data chunks each including at least one item, wherein each data chunk includes a data chunk size n number of items in the data chunk and wherein the data chunk size n is initially one item in the data chunk;
    assigning the plurality of data chunks having the same data chunk size n to a plurality of concurrent threads for processing on a corresponding one of the plurality of cores; and
    increasing the data chunk size n according to a sequence of at least one repeated power of two with occasional doubling up to a selected maximum data chunk size, wherein the data chunk size is determined from repeatedly multiplying floating point numbers selected from a range of greater than 1 and less than 2, taking an integer portion of each of the floating point numbers, and calculating a nearest lower power of two for each of the integer portions.

17. The computer readable medium of claim 16 wherein the floating point numbers selected from a range of greater than 1 and less than or equal to 1.3.

18. The computer readable medium of claim 16 wherein the data stream is provided from a cache in the memory of the computing device and the maximum data chunk size n is equal to a cache-line width.

19. The computer readable medium of claim 18 wherein the instructions include performing a boolean-AND operation.

\* \* \* \* \*